United States Patent [19]

Schmidt

[11] Patent Number: 4,488,388
[45] Date of Patent: Dec. 18, 1984

[54] SUPPORTING PIPE CLAMP

[76] Inventor: Victor P. Schmidt, 6527 Las Flores Dr., Boca Raton, Fla. 33433

[21] Appl. No.: 396,037

[22] Filed: Jul. 7, 1982

[51] Int. Cl.³ ............................................. E04F 17/00
[52] U.S. Cl. ..................................... 52/221; 285/192; 285/417; 285/421
[58] Field of Search .................... 52/220, 221; 285/45, 285/419, 373, 192, 189, 371, 372, 417, 418, 421

[56] References Cited

U.S. PATENT DOCUMENTS

| | | | |
|---|---|---|---|
| 681,090 | 8/1901 | White | 285/421 |
| 1,712,895 | 5/1929 | Metcalf | 52/220 |
| 2,471,301 | 5/1949 | Boosey | 52/220 |
| 2,858,114 | 10/1958 | Parris | 285/45 |
| 3,276,176 | 10/1966 | Jonsson | 52/220 |
| 3,905,623 | 9/1975 | Cassel | 285/417 |
| 4,120,129 | 10/1978 | Nagler | 52/219 |
| 4,236,736 | 12/1980 | Anderson | 285/419 |
| 4,391,458 | 7/1983 | Blakely | 285/373 |

FOREIGN PATENT DOCUMENTS 612558  1/1961  Canada .................................. 52/220

Primary Examiner—John E. Murtagh
Assistant Examiner—Kathryn L. Ford
Attorney, Agent, or Firm—Griffin, Branigan & Butler

[57] ABSTRACT

A pipe-supporting clamp is disclosed in several embodiments adapted to be permanently embedded in the masonry floor of a building structure for supporting a pipe extending through the center of the clamp. The device has anchor means formed therewith which are surrounded by the masonry material to prevent movement of the device in the floor. A means is also provided adjacent one end of the device for forcing a portion of the interior wall of the device into engagement substantially all around the circumference of a portion of the pipe to clamp the pipe against movement within the device.

24 Claims, 23 Drawing Figures

SUPPORTING PIPE CLAMP

PRIOR ART AND OBJECTS

Applicant is unaware of any device adapted to be embedded and anchored in the floor or wall of a building structure which has a means associated with it for clamping a pipe passing through the device to prevent its movement relative to the device.

Heretofore the only satisfactory means for supporting lengths of piping extending between floors of a building structure was either a pipe coupling means secured in the masonry material constituting the floor and pipe sections above and below the floor were connected at the ends thereof to the coupling means, an example of which, is shown in U.S. Pat. No. 4,313,286. This arrangement prohibited the free movement of the pipe extending through the floor which is desirable to facilitate its final connections to other elements. Another method was to form a void in the masonry material by means of a sleeve such as that shown, for example, in U.S. Pat. No. 3,294,358 and the pipe extending through the void was held in place by means of a riser clamp such as that disclosed, for example, in U.S. Pat. No. 2,881,997.

Use of the first mentioned device entails the cutting, fitting and cementing of pipe sections with the coupling members and testing the joints for leaks all of which requires needless labor and is time consuming. If riser clamps are used, the cost of the clamps themselves is significant as is the considerable labor cost involved in installing them around each pipe extending through each hole in each floor of a multi-story building. In addition, the area in the hole not occupied by piping must, by code in most jurisdictions, be sealed or packed so that a chimney is not created through which fire can pass from one floor to another which further increases costs.

Applicant has invented a novel device disclosed in various embodiments which overcomes the substantial disadvantages of the prior art devices above described for piping fluids between floors of building structures.

It is therefore the main object of this invention to provide an improved pipe supporting clamp.

It is another object of this invention to provide a device which is cast into and anchored by the masonry material constituting the floor or wall and which enables a continuous pipe, cable or the like made of any metal or plastic-type material to be passed through the device, thus eliminating the need of special cements or sealed joints to hold the pipe relative to the device.

It is yet another object of this invention to provide a device which in one embodiment clamps the pipe substantially around its entire circumference to ensure maximum support.

It is a further object of this invention to provide a device which due to its unique construction and method of clamping provides a fire barrier and eliminates the necessity of using packing material.

It is a still further object of the present invention to provide a supporting pipe clamp which utilizes a wedge slidable in a slot in the wall of the clamp to secure the pipe or conduit passing therethrough.

It is yet another object of the present invention to provide a supporting pipe clamp which is effective for pipes and conduits having easily collapsible walls that must be protected against excessive pressure being exerted thereon.

These and other objects of the invention will become apparent during the course of the following description and appended claims taken in connection with the accompanying drawings forming a part hereof.

DETAILED DESCRIPTION OF PREFERRED EMBODIMENTS

Figure 1:
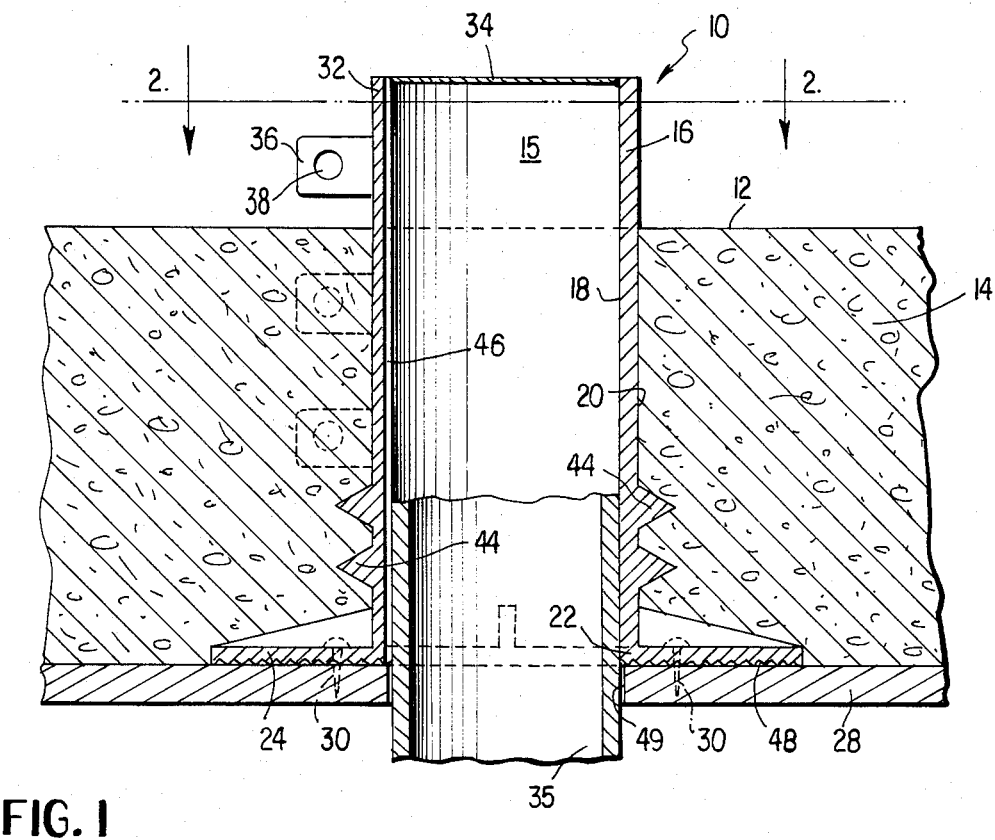
FIG. 1 is a cross-sectional view of one embodiment of the pipe support clamp of the present invention taken along line H of FIG. 2.
Figure 2:
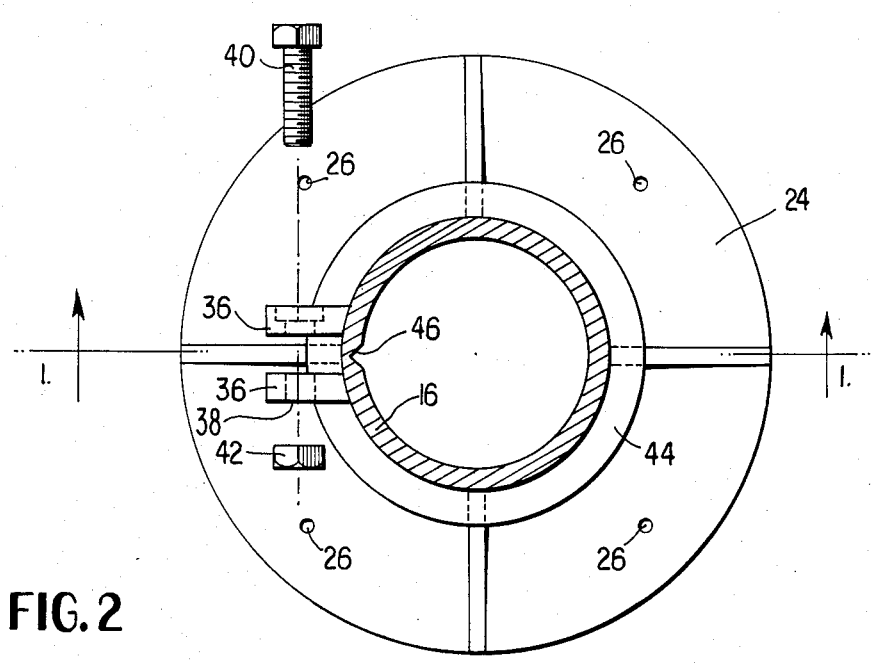
FIG. 2 is a cross-sectional view taken along lines 2—2 of FIG. 1.

Referring now to the drawings where like characters of reference indicate like elements in each of the several embodiments. FIGS. 1 and 2 show at 10 one embodiment of the pipe supporting clamp of the present invention. The clamp 10 is adapted to be embedded in the floor 12 of masonry material 14 found in present day multi-story construction. The clamp 10 forms a passage 15 in the floor 12 through which fluid piping, wire conduits or the like can pass from floor to floor and be held relative to the device on each floor by clamping means associated with each clamp 10 as will now be fully described.

The clamp 10 has a hollow cylindrical-shaped sleeve 16 with an inner surface 18 defining a smooth continuous wall and an outer surface 20. The end 22 of the sleeve 16 has an outward, radially extending flange 24. The flange 24 has a plurality of holes 26 therethrough which enable the clamp 10 to be secured to the wooden framing 28 by nails 30. The framing 28 serves as a form for sustaining the poured masonry floor 12 initially or until it has had time to set whereupon the framing is removed. The other end 32 of sleeve 16 has a "knock out" disc 34 integrally formed with the sleeve 16 which serves to prevent the masonry material 14 from entering the through passage 15 during pouring or working thereof. The disc 34 is removed after the floor is poured. Bracing ribs 25 can also be integrally formed with the sleeve 16 and flange 24.

Pipe 35, only a portion of which is shown in FIG. 2 for clarity, is held relative to the clamp 10 in through passage 15 by friction exerted by the inner surface 18 substantially around the outside of the pipe by means of spaced apart tabs 36 integrally formed with the sleeve 16 at the other end 32 thereof. The tabs 36 each have a hole 38 in registry through which a bolt 40 passes. A nut 42 is provided on the other side into which the bolt 40 tightens. As the bolt 40 is tightened down, the walls 18 of the sleeve 16 are drawn into frictional engagement with the outside of the pipe 35. The sleeve 16 can be provided with additional sets of tabs 36 at various positions along the sleeve as shown in phantom lines to enable the same clamp to be used for floors of different thicknesses.

In order to prevent the sleeve 16 from slipping out of the floor 12 under the weight of the secured pipe 35, one or more radially extending circumferential lips 44 around the outer surface 20 which serve to anchor the sleeve 16 in the masonry material 14. A longitudinally extending notch 46 can also be provided between the tabs 36 in the inner surface 18 of the sleeve 16 to facilitate drawing of the tabs 36 together and the inward movement of the inner surface 18 toward the pipe 35.

A plurality of concentric grooves 48 can be provided in the face of the flange 24 which engage the framing 28 to prevent water associated with the fresh masonry material from entering the hole 49 formed in the framing 28.

Referring now to FIGS. 3, 4, 5 and 6 another embodiment of the clamp of the present invention is shown suitable for use in securing a drain pipe 50 for a mounting plate 52 to which a floor mounted toilet bowl 54 is attached. The mounting plate 52 typically has a tubular portion 56 one end of which fits in the drain pipe 50 and the other end of which has a circular flange 58. The flange 58 rests adjacent the masonry floor and is bolted to the toilet bowl 54. The hollow sleeve 60 has a flange 62 and a plurality of circumferentially extending rectangular shaped grooves 64 which serve to anchor the sleeve 60 in the masonry floor. At least one pair of tabs 66 are integrally formed with the sleeve 60 the length thereof. The tabs 66 have a plurality of spaced apart holes 68 in registry for accomodating a tightening bolt and nut 40, 42, respectively at various levels depending on the thickness of the masonry floor. Because the upper end 70 of the sleeve 60 is flush with the masonry floor, a discardable box-like attachment 72 is provided which fits against the sleeve 60 around the uppermost part of tabs 66 to form a cavity within the masonry floor to enable a bolt 40 to be inserted in the holes 68 and tightened into a nut 42. The box-like attachment 72 has five sides and an opening 74. The ends 76 of the sides 78 forming the opening 74 have grooves which fit into or mate with the grooves 64 on the sleeve 60. A projection 82 having knobs 84 on the end thereof is integrally formed with the box and is inserted between the tabs 66 until the knobs 84 engage the holes 68 to thereby frictionally hold the attachment 72 in place during pouring of the masonry floor whereupon it is discarded when the floor hardens. Indentations 86 can be provided in one of the tabs 66 adjacent the holes 68 substantially the shape of the head of the bolt 40 to prevent it from rotating as the nut 42 is tightened. A longitudinally extending notch 46 is provided to facilitate frictional engagement of the inner surface of the sleeve 60 as the tabs 66 are drawn together by the bolt and nut in the same manner as previously discussed with regard to the embodiment of FIGS. 1 and 2. If additional clamping capacity is desired, a second set of tabs 66 can be provided shown in phantom lines opposite tabs 66. Bracing ribs 25 can also be integrally formed between the sleeve 60 and the flange 62.

Figure 3:
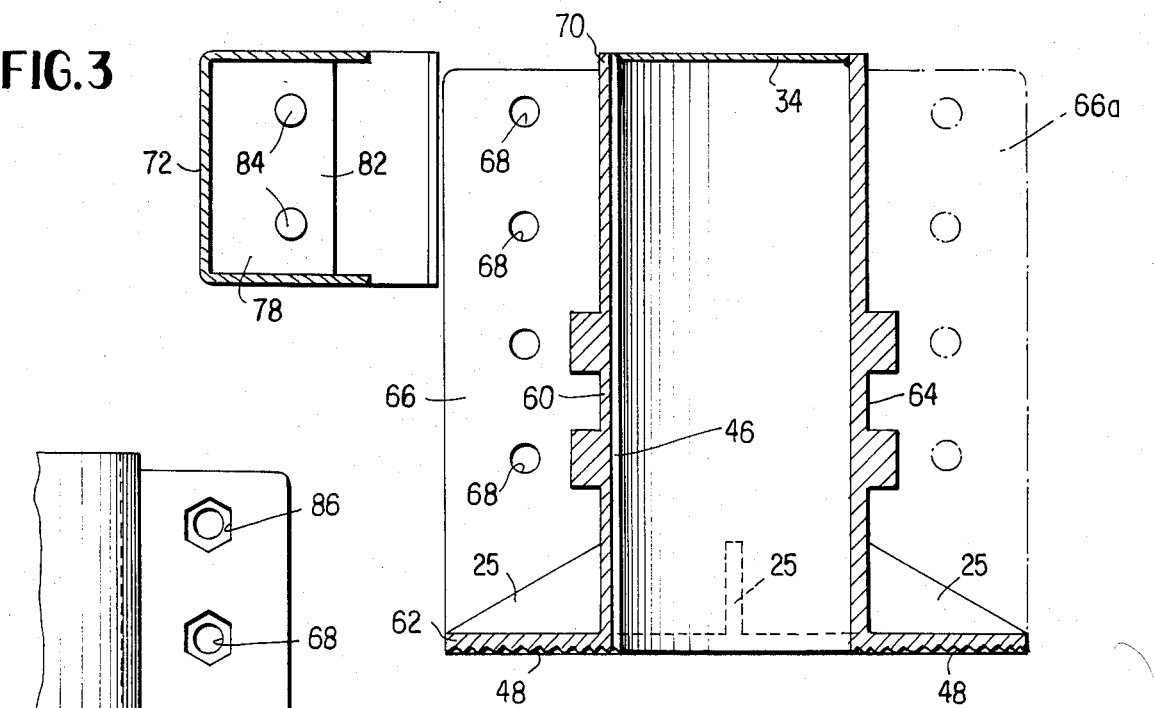
FIG. 3 is a cross-sectional view of another embodiment of the pipe support clamp of the present invention taken along line 3—3 of FIG. 4.
Figure 5:
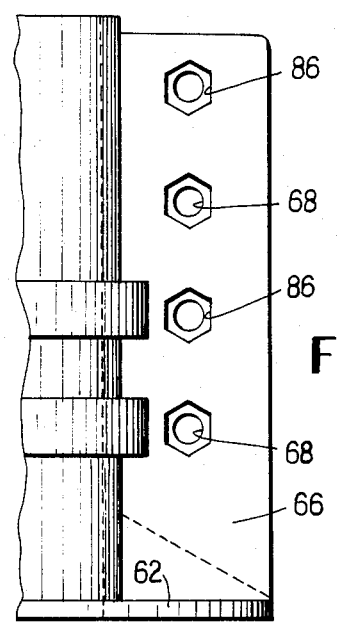
FIG. 5 is a side view taken along lines 5—5 of FIG. 4.
Figure 4:
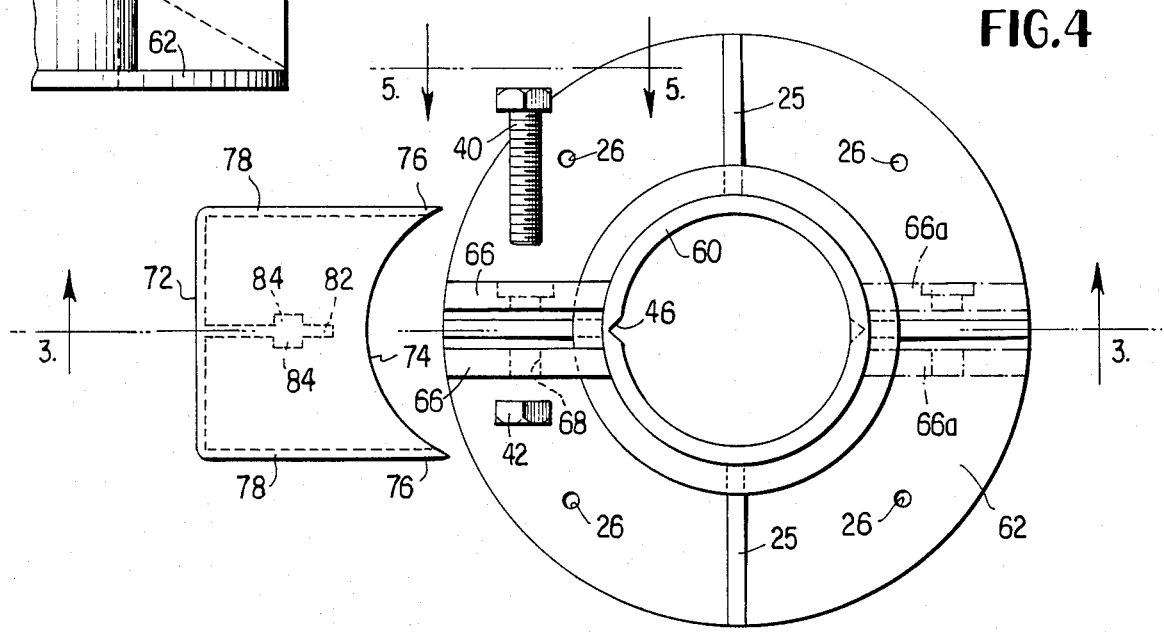
FIG. 4 is a plan view of the clamp of FIG. 4.
Figure 6:
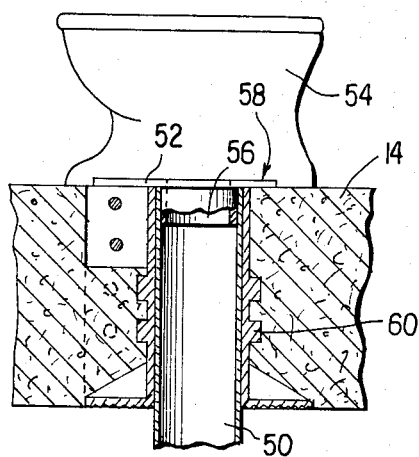
FIG. 6 is a partial cross-sectional view of the support clamp of FIG. 3 used with a conventional toilet bowl.
Figure 9:
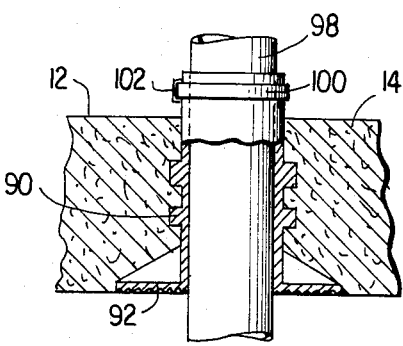
FIG. 9 is a partial cross-sectional view of the support clamp of FIG. 7 used with a conventional section of pipe.
Figure 7:
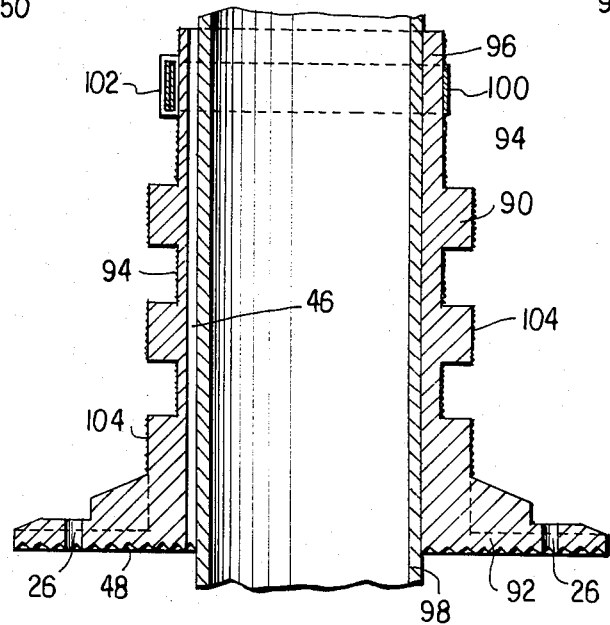
FIG. 7 is a cross-sectional view of another embodiment of the pipe support clamp of the present invention utilizing a conventional tie-strap taken along line 7—7 of FIG. 8.
Figure 8:
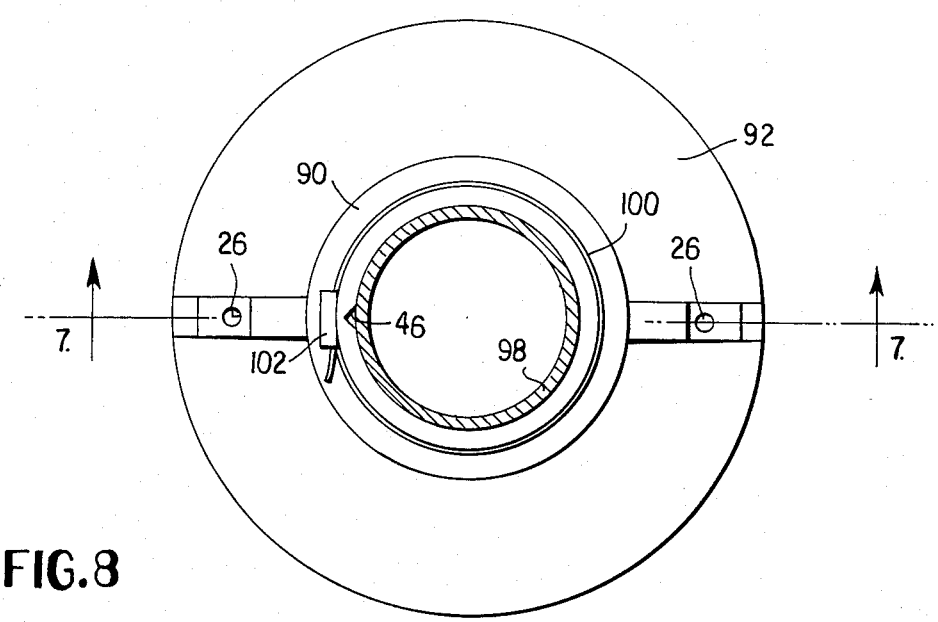
FIG. 8 is a cross-sectional view taken along lines 8—8 of FIG. 7.
Figure 10:
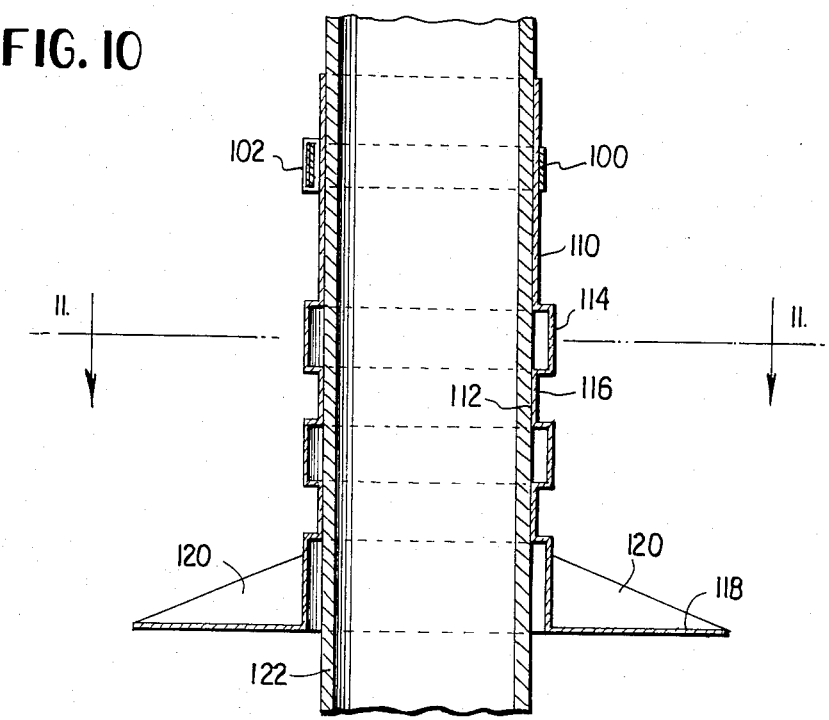
FIG. 10 is a cross-sectional view of another embodiment of the pipe support clamp made out of sheet metal taken along lines 10—10 of FIG. 11.
Figure 11:
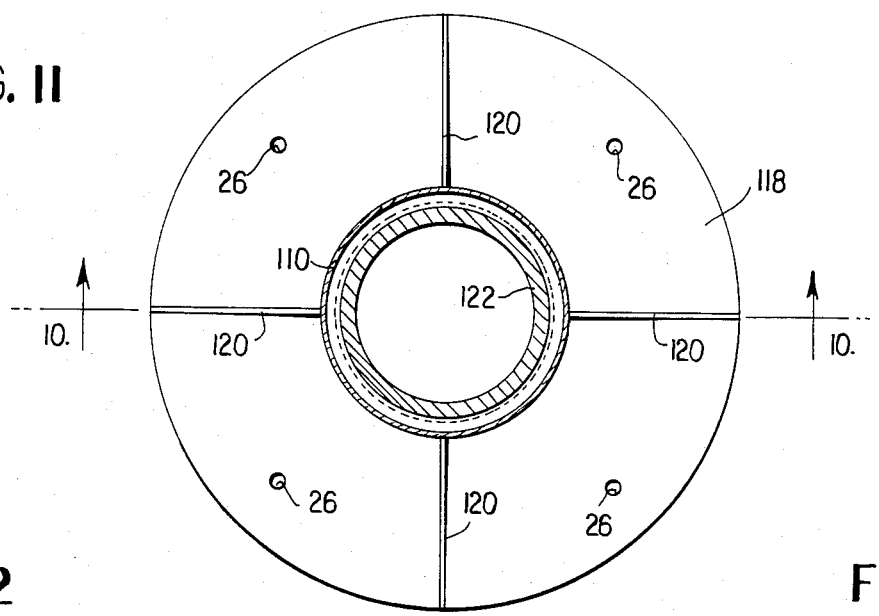
FIG. 11 is a cross-sectional view taken along the lines 11—11 of FIG. 10.

FIGS. 7, 8, and 9 shows another embodiment of the clamp of the present invention having a sleeve 90 with a flange 92 and a plurality of spaced-apart rectangular shaped anchor grooves 94 similar to those in the embodiment of FIG. 3. In order to compress the inside wall 96 of the sleeve 90 into frictional clamping engagement with a pipe 98, a length of conventional metal strap material 100 is provided in one or more of the grooves 94 above the surface of the floor 12. The ends of the strap material 100 are drawn together in overlapping fashion to compress the inside wall 96 by means of a conventional tensioner tool (not shown) which places a seal 102 around the overlapped portions of the strap material to secure them together. Such a tensioner tool and seal is manufactured by the Signode Corporation of Baltimore, Md. In addition to the water sealing grooves 48 provided on the face of flange 92, the outer surface areas parallel to the inner wall 96 can have fine, circumferentially extending grooves 104 formed therein. The fresh masonry material 14 will fill the grooves 104 to effectively prevent water from passing from surface of the floor 12 along the outside of the sleeve 90 to the bottom of the floor adjacent the flange 92.

Figure 12:
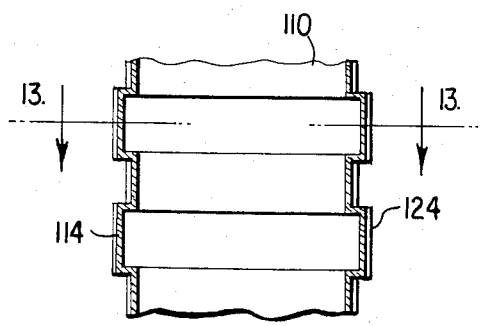
FIG. 12 is a fragmentary view in cross-section of a portion of the clamp of FIG. 10.
Figure 13:
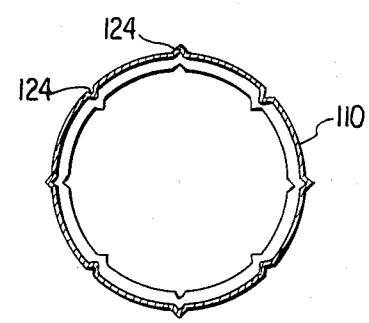
FIG. 13 is a cross-sectional view taken along the lines 13—13 of FIG. 12.

Another embodiment is disclosed in FIGS. 10, 11, 12 and 13 wherein the sleeve 110 is made out of thin gauge sheet metal having a corrugated inner wall surface 112 and outer wall surface 114 comprising a plurality of spaced-apart, circumferentially extending indentations 116. A flange 118 is secured at one end of the sleeve 110 by spot welding or the like as are a plurality of bracing ribs 120. The inner wall surface is compressed into clamping engagement with a pipe 122 by means of metal strap material 100 and a seal 102 in the same manner as previously discussed with regard to the embodiment of FIG. 7. In order to provide added rigidity, longitudinally extending notches 124 can be formed in the inner and outer wall surfaces 112, 114, respectively as shown in FIGS. 12 and 13. The notches 124 also enable the metal to crimp when compressed to ensure complete clamping engagement with the pipe 122.

Figure 16:
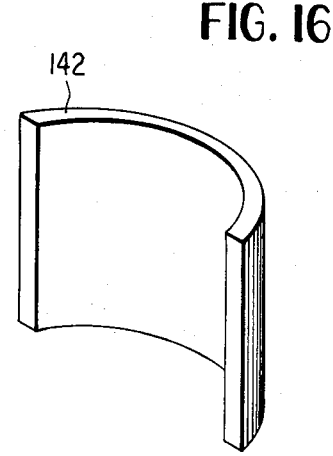
FIG. 16 is a perspective view of a spacer used with the clamp embodiment of FIG. 14.
Figure 17:
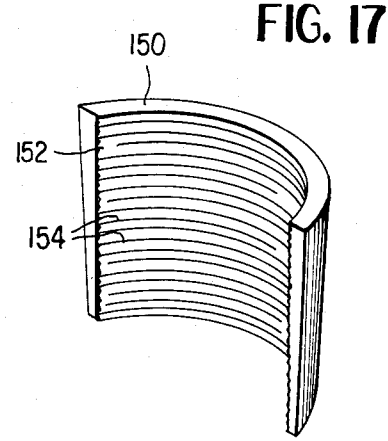
FIG. 17 is a perspective view of a wedge used with the clamp embodiment of FIG. 14.
Figure 15:
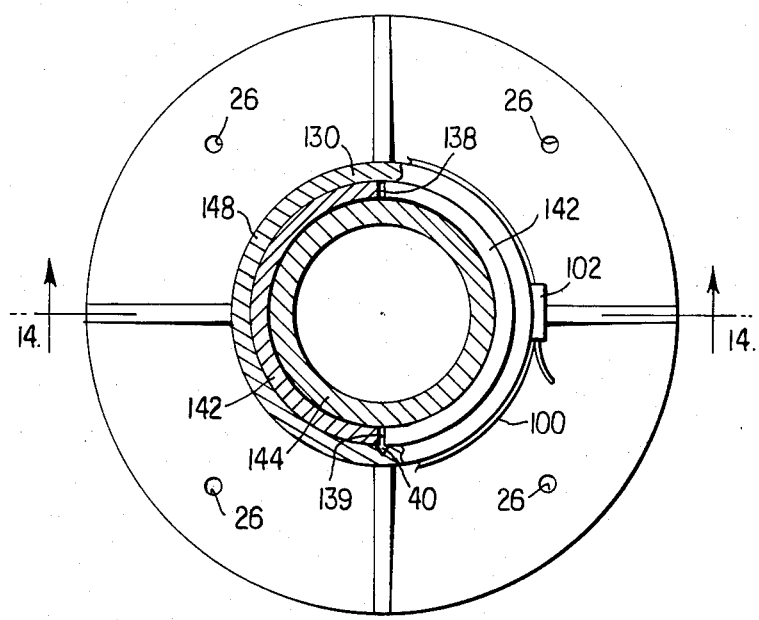
FIG. 15 is a partial cross-sectional view taken along the lines 15—15 of FIG. 14.
Figure 18:
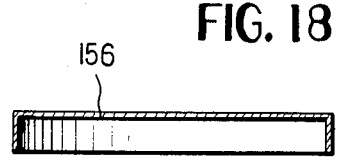
FIG. 18 is a cross-sectional view of a cover cap.

Referring now to FIGS. 14, 15, 16, 17 and 18 another embodiment of the present invention is disclosed which is capable of clamping a pipe of different diameters utilizing the same clamping device. This is achieved by providing a sleeve 130 having a flange 132 and anchor grooves 134 similar to the embodiment of FIG. 7. The inner wall surface 136, however, has a cylindrical shaped recess or channel 138 having an inside surface 139 extending longitudinally from the end 140 inwardly. The area between the outside surface 146 of the pipe 144 and the inside surfaces 136 and 139 of the sleeve 130 and channel 138 respectively, constitutes an area for the pipe to "play" to thereby facilitate connection of the ends of the pipe to other fittings. A pair of curved shims 142, in one variation as shown in FIG. 16, are provided of varying thicknesses to accommodate pipes 144 of varying diameters. After the pipe 144 has been inserted through the sleeve 130, a pair of shims 142 are selected having a thickness which when inserted in the recess 138 substantially fill the gap between the inside surface 139 and the outside surface 146 of the pipe 144. Metal strap material 100 and seal 102 are then placed around the outer wall surface 148 adjacent the shims 142 and tightened to draw the shims 142 into frictional clamping engagement with the pipe 144 and into approximate engagement with each other. In another variation, a pair of wedge-shaped shims 150 are used which are made in varying tapered thicknesses to accommodate pipes 144 of different diameters. The wedge-shaped shims 150 are driven into the recess 138 adjacent the outside surface 146 of the pipe 144 by a hammer or the like to frictionally hold the pipe 144 thus eliminating the necessity of providing a metal strap 100 and associated seal 102. The inside surface 152 of the wedge-shape shims 150 can have a serrations 154 or the like to inhance the gripping ability of the shim against the pipe. In order to prevent masonry material from entering the end 140 of the sleeve 130, a cylindrical-shaped cap 156 is provided which fits over the end 140 during pouring and which is removed after the masonry material has set. This same cap 156 can be used to cover the end of any other embodiment of this invention during pouring which is not provided with a removable disc 34 as shown in FIG. 1.

Figure 14:
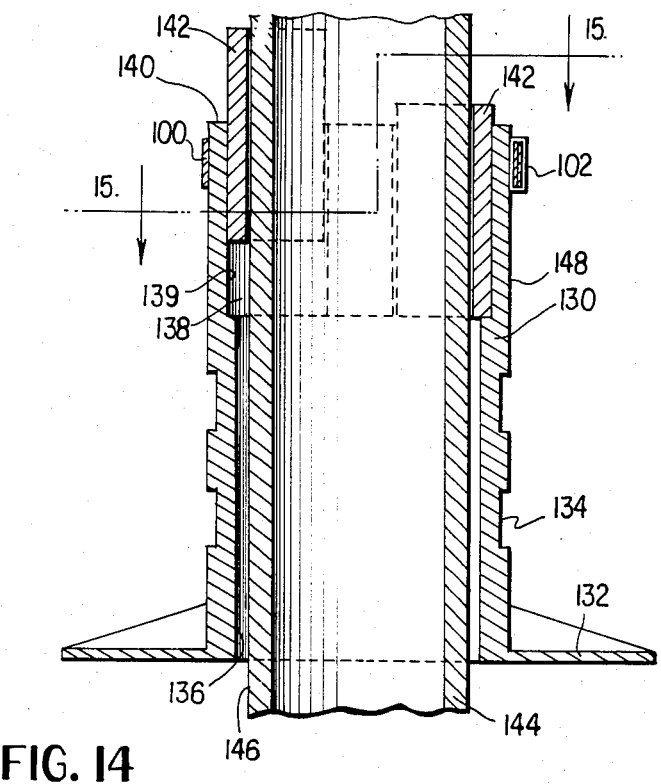
FIG. 14 is a cross-sectional view of another embodiment of the pipe support clamp of the present invention taken along lines 14—14 of FIG. 15.
Figure 19:
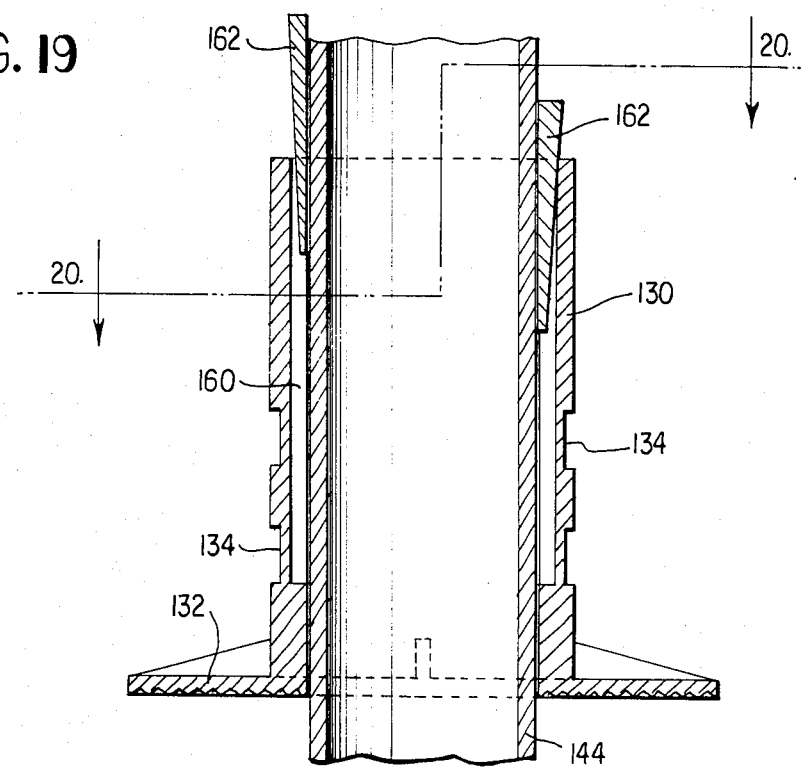
FIG. 19 is a cross-sectional view of another embodiment of the pipe support clamp of the present invention taken along lines 19—19 of FIG. 20.
Figure 21:
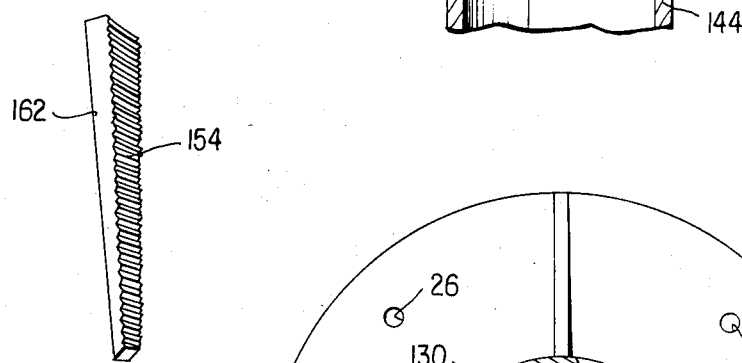
FIG. 21 is a perspective view of a wedge used with the clamp embodiment of FIG. 19.
Figure 20:
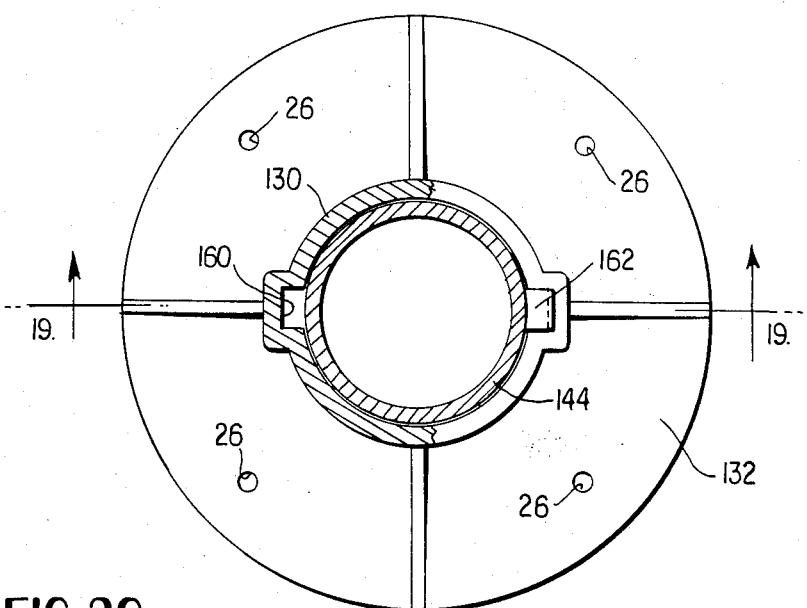
FIG. 20 is a partial cross-sectional view taken along the lines 20—20 of FIG. 19.

FIGS. 19, 20 and 21 show an embodiment of the invention which is similar to that of FIG. 14, however, as will be noted the recesses 160 which can be one or more in number are smaller to accommodate a smaller wedge-shaped shim 162 and extend substantially the entire length of the inner surface 139 of the sleeve 130. By using a sleeve 130 with a long recess 160, the same sleeve can be used in masonry floors having different thicknesses. All that need be done is to cut off the portion of the sleeve 130 extending above the masonry floor after it has set and the shims 162 driven into the remaining portion of the recess 160 after the pipe 144 has been inserted.

Figure 22:
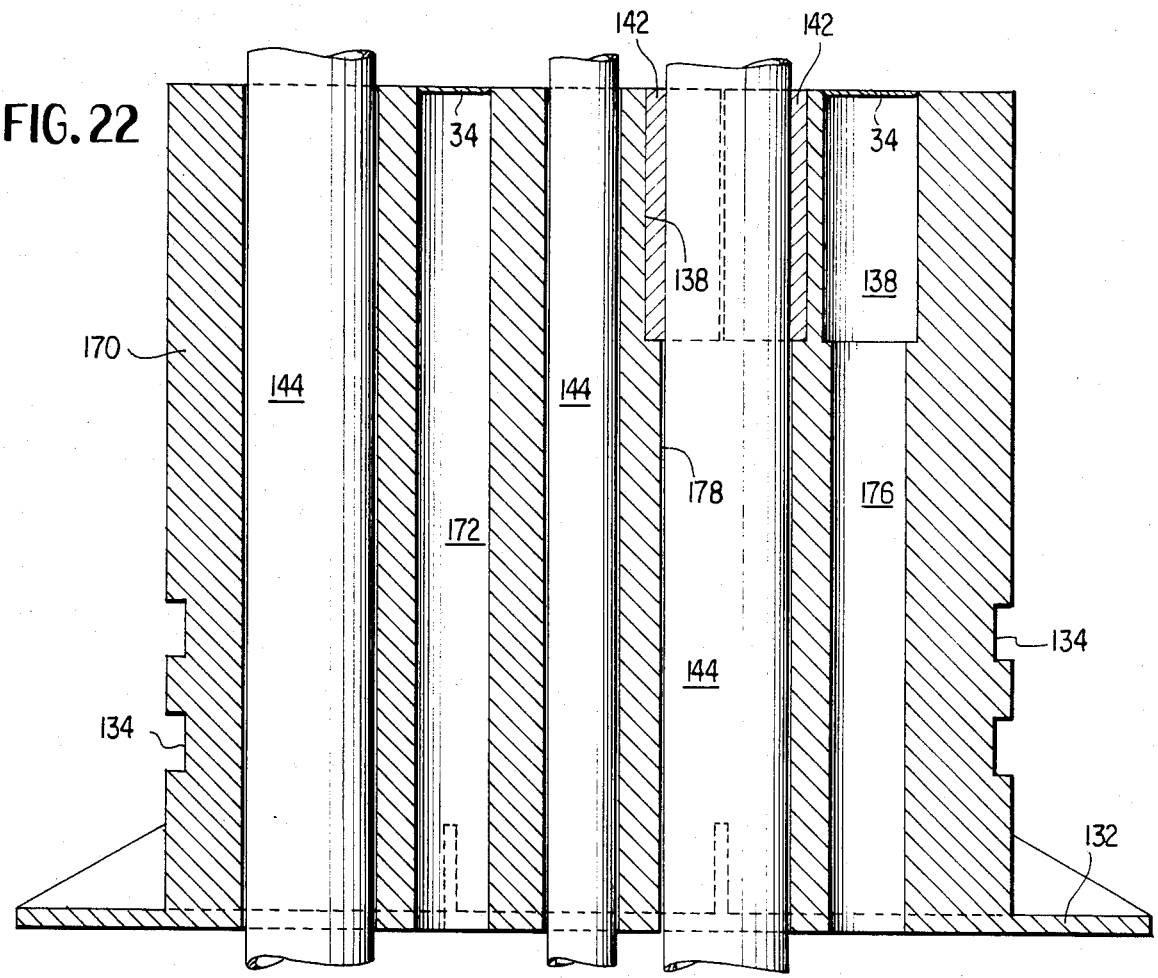
FIG. 22 is a cross-sectional view of another embodiment of the pipe support clamp of the present invention taken along lines 22—22 of FIG. 23.
Figure 23:
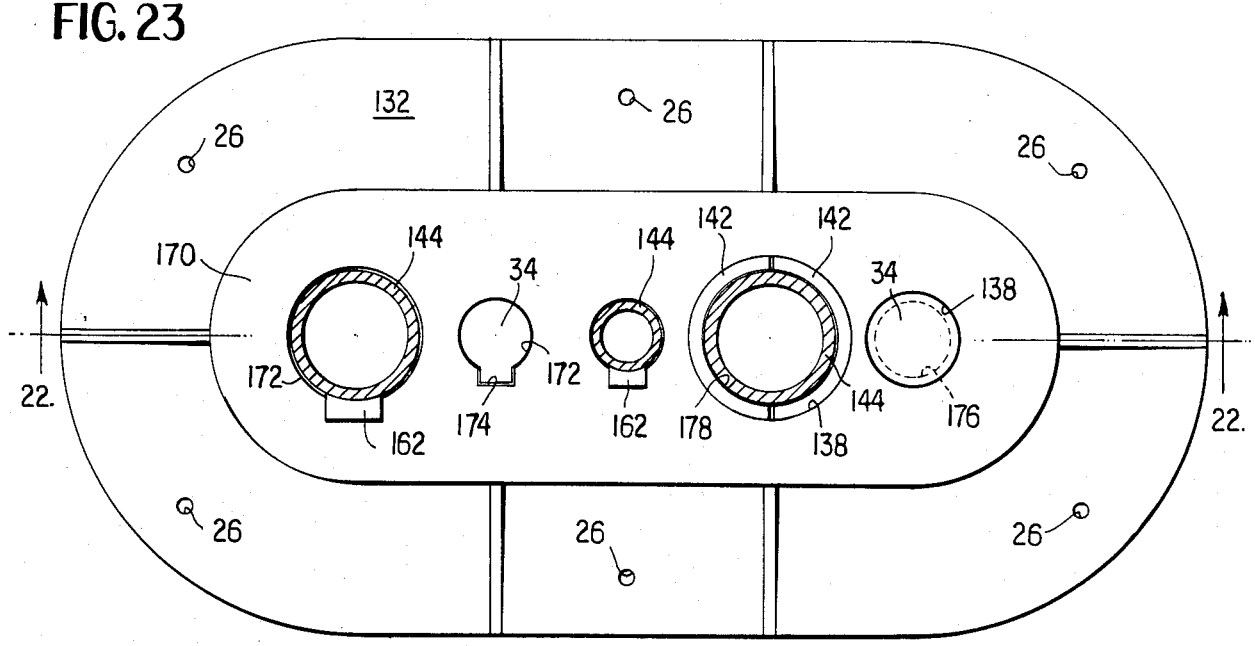
FIG. 23 is a plan view of the clamps of FIG. 22.

FIGS. 22 and 23 show another embodiment of the present invention wherein the sleeve 170 has a plurality of through passages of different diameters to accommodate a number of pipes of differing wall thicknesses and material. Through passages 172 are shown to be of the type having at least one recess or channel 174 for securing piping having a wall thickness sufficient not to be dented or otherwise misshaped by a wedge 162 as shown in FIG. 21 hammered into the recess 174 against the pipe 144 in the same manner previously described with regard to the embodiment of FIG. 19. Other through passages such as those shown at 176 can have a recess 138 for accommodating a pair of curved shims 142 if cement is used or semi-circular shaped wedges 150 if the pipe 178 is of thin wall copper or a wire conduit having a thin wall to reduce the liklihood of denting or crushing the wall thereof. Each type of through passage 172, 176 can be provided with a "knockout" disc 34 to seal the ends of those not in use.

Applicant has thus disclosed numerous embodiments of his unique pipe clamp support for use in various plumbing situations and with masonry floors of varying thickness. As can also be seen, because the space between the inside of the sleeve and the outside of the pipe is substantially closed by the clamping means of the various embodiments, no packing as required by present day building codes is thus necessary to close this space to thereby prevent fire from passing through the space between floors. For the sake of clarity, the water sealing grooves 48 associated with the various plastic flanges and grooves 104 associated with the various plastic sleeves can be provided, although not always shown, with each of the various embodiments. The various embodiments of the device can be made out of numerous materials such as steel, aluminum and plastics of various types and the like. It will of course be evident that other shapes may be employed for the supporting pipe clamp without departing from the spirit and scope of the invention.

I claim:

1. A tubularly-shaped pipe supporting clamp for being embedded in an initially form-sustained floor of a building structure molded of masonry material, said clamp being fixidly attached to a board of said form prior to introduction of said masonary material into said form and extending therefrom upwardly to produce a pipe passageway through said molded floor, said tubularly-shaped pipe supporting clamp comprising:
    (a) a substantially rigid hollow sleeve through which a pipe to be clamped passes having an inner surface defining a wall and an outer surface, said sleeve being formed of a single integral member being continuous about its perimeter,
    (b) flange means at one end of said sleeve having holes therein for receiving fastening members for attaching said device to said board of said form,
    (c) anchor means formed in said outer surface of said sleeve for preventing axial movement of said device in said masonry floor after it has cured, and
    (d) forcing means at the other end of said sleeve located at positions extending from the other end toward said flange means for a distance of substantially greater than half the length of said sleeve for selectively forcing selective portions of said wall radially inward into engagement substantially all around the circumference of said pipe to hold said pipe against movement in said sleeve, said other end of said sleeve being adapted to be cut off to allow said sleeve to be cut to various lengths ranging from its original length to substantially less than half its original length, whereby when said other end is cut off, sufficient forcing means remain for holding said pipe to the end of said sleeve opposite said flange means, said sleeve wall having a substantially uniform cross-sectional shape at said positions where said forcing means is located when said forcing means is not actuated to force said wall portion radially inwardly; said forcing means comprising a pair of oppositely disposed, circumferentially-spaced-apart tabs on the side of said sleeve said forcing means being positioned longitudinally along said sleeve for a distance substantially greater than half the length of said sleeve extending from said other end, each of said tabs having at least one bore therethrough which is in registery with the bore of the other tab of the pair, said tabs having one end thereof integrally formed with said sleeve and wherein said forcing means further comprises a fastener passing through the bores of the tab pair which is located at the opposite end of said sleeve from said flange for drawing said tabs toward each other.

2. A pipe-supporting clamp as set forth in claim 1 further comprising removable shield means adapted to attach to said spaced apart tab means for preventing said masonry material from contacting at least said tab means adjacent said other end of said sleeve.

3. A pipe-supporting clamp as set forth in claim 1 wherein said forcing means comprises a single spaced apart tab pair which extends approximately the length of said sleeve.

4. A pipe-supporting claim as set forth in claim 1 further comprising at least one longitudinally extending groove in said inner surface of said wall positioned between the tabs of said tab pair to facilitate the radially inward movement of said wall under the pressure of said forcing means.

5. A pipe-supporting clamp as set forth in claim 1 further comprising at least one longitudinally extending groove in said outer surface of said sleeve to add rigidity to said sleeve.

6. A pipe-supporting clamp as set forth in claim 1 wherein said anchor means comprises at least one circumferentially extending notch in said outer surface of said sleeve.

7. A pipe-supporting clamp as set forth in claim 1 wherein said anchor means comprises at least one circumferentially extending rib on said outer surface of said sleeve.

8. A pipe supporting clamp as set forth in claim 1 further comprising a second pair of oppositely disposed, spaced apart tabs on the other side of said sleeve similar to said first pair.

9. A pipe-supporting clamp as set forth in claim 1 further comprising a plurality of reinforcing rib means located between said outer surface of said sleeve and said flange means.

10. A pipe-supporting clamp as set forth in claim 1 further comprising a plurality of spaced-apart groove means formed in said outer surface for preventing the passage of water between said outer surface and said masonry material.

11. A pipe-supporting clamp as set forth in claim 1 further comprising a plurality of radially extending grooves formed in said flange to prevent the passage of water between said flange and said form.

12. A pipe-supporting clamp as set forth in claim 1 wherein said sleeve and said flange means are made of plastic material.

13. A pipe-supporting clamp as set forth in claim 1 wherein said sleeve and said flange means are made of thin gage sheet metal.

14. A tubularly-shaped pipe-supporting clamp for being embedded in an initially form-sustained floor of a building structure molded of masonry material, said clamp being fixedly attached to a surface of said form prior to introduction of said masonry material into said form so as not to move when said masonry material is introduced into said form and extending upwardly therefrom, to produce a pipe passageway through said molded floor at a particular position, said tubularly shaped pipe supporting clamp comprising:

(a) a substantially rigid sleeve having at least an inner surface defining a tubular wall through which a pipe to be clamped passes and an outer surface, (b) flange means at one end of said sleeve for attaching said device to said form, (c) anchor means formed in said outer surface of said sleeve for preventing axial movement of said device in said masonry floor after it has cured, (d) a forcing means for holding said pipe against movement relative to said sleeve, said forcing means including at least one longitudinally-extending slot-shaped recess formed in the inner surface of said wall extending from the other end of said sleeve for a distance substantially greater than half the length of said sleeve, but with the sleeve not having said recess at other longitudinal positions so that the sleeve rather closely encircles said pipe at said other longitudinal positions, said forcing means further including a wedge means longitudinally slidable by longitudinal linear movement in said recess between the inner wall of said sleeve and the outer surface of a pipe when said pipe is in said passageway for simultaneously engaging said pipe and the inner surface of said wall in said slot to wedge therebetween with increasing force as said wedge means is longitudinally slid in said recess to hold said pipe and said wedge against movement in said sleeve, said other end of said sleeve being adapted to be cut off to allow said sleeve to be cut to various lengths ranging from its original length to substantially less than half its original length, whereby when said other end is cut off to an extent substantially greater than half the length of the sleeve there remains a slot shaped recess into which the wedge means can be longitudinally slid.

15. A pipe-supporting clamp as set forth in claim 14 further comprising a pair of oppositely disposed slot shaped recesses formed in said wall extending from the other end of said sleeve for a distance substantially greater than half the length of said sleeve, and wedge means longitudinally slidable in each of said recesses for engaging opposite sides of said pipe against movement of said sleeve.

16. A pipe-supporting clamp as set forth in claim 14 further comprising a plurality of spaced-apart groove means formed in said outer surface for preventing the passage of water between said outer surface and said masonry material.

17. A pipe-supporting clamp as set forth in claim 14 further comprising a plurality of radially extending grooves formed in said flange to prevent the passage of water between said flange and said form.

18. A pipe-supporting clamp as set forth in claim 14 wherein said sleeve and said flange are made of plastic material.

19. A pipe-supporting clamp as set forth in claim 14 wherein said sleeve and said flange means are made of thin gage sheet metal.

20. A pipe-supporting clamp as set forth in claim 14 wherein said anchor means comprises at least one circumferentially extending notch in said outer surface of said sleeve.

21. A pipe-supporting clamp as set forth in claim 14 wherein said anchor means comprises at least one circumferentially extending rib on said outer surface of said sleeve.

22. A pipe-supporting clamp as set forth in claim 14 wherein said pipe engaging means has a serrated edge which grips said pipe.

23. A pipe-supporting clamp as set forth in claim 14 wherein said pipe engaging means is wedge-shaped.

24. A pipe-supporting clamp as set forth in claim 14 wherein said rigid sleeve has a plurality of tubular walls through which a plurality of different pipes to be clamped pass, each of said walls having at least one slot-shaped recess formed therein and at least one wedge means slidable in said recess for engaging each of said pipes to hold same against movement in said sleeve.

* * * * *